United States Patent
Banchi et al.

(10) Patent No.: US 12,504,847 B2
(45) Date of Patent: Dec. 23, 2025

(54) IN-CELL TOUCH PANEL AND CONTROL METHOD THEREOF

(71) Applicant: Sharp Display Technology Corporation, Kameyama (JP)

(72) Inventors: Takahiro Banchi, Kameyama (JP); Akihisa Iwamoto, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/914,479

(22) Filed: Oct. 14, 2024

(65) Prior Publication Data

US 2025/0165094 A1 May 22, 2025

(30) Foreign Application Priority Data

Nov. 17, 2023 (JP) ................................. 2023-196043

(51) Int. Cl.
*G06F 3/041* (2006.01)
*G06F 3/044* (2006.01)
*G09G 3/36* (2006.01)

(52) U.S. Cl.
CPC ........ *G06F 3/04166* (2019.05); *G06F 3/0412* (2013.01); *G09G 3/3677* (2013.01); *G06F 3/044* (2013.01); *G09G 2310/0286* (2013.01); *G09G 2354/00* (2013.01)

(58) Field of Classification Search
CPC .... G06F 3/0412; G06F 3/04166; G06F 3/044; G09G 2310/0286; G09G 2354/00; G09G 3/3677

See application file for complete search history.

(56) References Cited

U.S. PATENT DOCUMENTS

| | | | |
|---|---|---|---|
| 2012/0056835 A1 | 3/2012 | Choo et al. | |
| 2013/0241814 A1* | 9/2013 | Hirabayashi | G06F 3/0412 345/100 |
| 2015/0160766 A1* | 6/2015 | Park | G09G 3/3674 345/173 |
| 2017/0228087 A1* | 8/2017 | Liu | G06F 3/0443 |
| 2022/0236817 A1 | 7/2022 | Kida et al. | |
| 2024/0256061 A1* | 8/2024 | Kim | G06F 3/0446 |

FOREIGN PATENT DOCUMENTS

JP 2012-059265 A 3/2012
JP 2022-114180 A 8/2022

* cited by examiner

*Primary Examiner* — Hong Zhou
(74) *Attorney, Agent, or Firm* — ScienBiziP, P.C.

(57) ABSTRACT

An in-cell touch panel includes a first scanning line driving circuit that supplies a display driving signal to a first scanning line group among multiple scanning lines; a second scanning line driving circuit that supplies a display driving signal to a second scanning line group among the scanning lines; a touch detection circuit that detects a touch by a pointer by acquiring a detection signal from at least a subset among multiple touch detection electrodes; and a control circuit. The control circuit performs a first scanning operation to supply the display driving signal to the first scanning line group, a touch detection operation after the first scanning operation to detect the touch with the touch detection circuit, a second scanning operation to supply the display driving signal to the second scanning line group, and the touch detection operation after the second scanning operation.

4 Claims, 10 Drawing Sheets

IN-CELL TOUCH PANEL AND CONTROL METHOD THEREOF

BACKGROUND

1. Field

The present disclosure relates to an in-cell touch panel and a control method thereof.

2. Description of the Related Art

The in-cell touch panel disclosed in Japanese Unexamined Patent Application Publication No. 2012-59265 includes a touch sensor array, a pixel array, a gate driver, a touch controller, and a timing controller. Within a frame period, the timing controller alternates between a display mode in which the pixel array is driven by the gate driver and a touch sensing mode in which the touch sensor array is driven by the touch controller.

The in-cell touch panel disclosed in Japanese Unexamined Patent Application Publication No. 2012-59265 alternates between the display mode and the touch sensing mode 16 times within one frame period. Since the number of switching operations between the display mode and the touch sensing mode is higher every frame period in the in-cell touch panel, total time used to switch between the display mode and the touch sensing mode (time used to switch each time multiplied by the number of switching operations) is longer. As a result, the sum of the lengths of time excluding time used to operate in the display and the touch sensing mode is prolonged within one frame period in the in-cell touch panel, it is difficult to reduce one frame period (namely, to operate the panel at a higher refresh rate).

It is desirable to provide an in-cell touch panel operable at a higher refresh rate and a control method thereof.

SUMMARY

According to a first aspect of the disclosure, there is provided an in-cell touch panel including: a first scanning line driving circuit that supplies a display driving signal to a first scanning line group among multiple scanning lines; a second scanning line driving circuit that supplies a display driving signal to a second scanning line group among the scanning lines; a touch detection circuit that detects a touch by a pointer by acquiring a detection signal from at least a subset among multiple touch detection electrodes; and a control circuit, wherein the control circuit performs a first scanning operation that causes the first scanning line driving circuit to supply the display driving signal to the first scanning line group, performs a touch detection operation that detects the touch with the touch detection circuit after the first scanning operation, performs a second scanning operation that causes the second scanning line driving circuit to supply the display driving signal to the second scanning line group after the touch detection operation, and performs the touch detection operation after the second scanning operation.

According to a second aspect of the disclosure, there is provided a control method of an in-cell touch panel including: a first scanning line driving circuit that supplies a display driving signal to a first scanning line group among multiple scanning lines; a second scanning line driving circuit that supplies a display driving signal to a second scanning line group among the scanning lines; a touch detection circuit that detects a touch by a pointer by acquiring a detection signal from at least a subset among multiple touch detection electrodes; and a control circuit, wherein the control method includes performing a first scanning operation that causes the first scanning line driving circuit to supply the display driving signal to the first scanning line group, performing a touch detection operation that detects the touch with the touch detection circuit after the first scanning operation, performing a second scanning operation that causes the second scanning line driving circuit to supply the display driving signal to the second scanning line group after the touch detection operation, and performing the touch detection operation after the second scanning operation.

DESCRIPTION OF THE EMBODIMENTS

Figure 1:
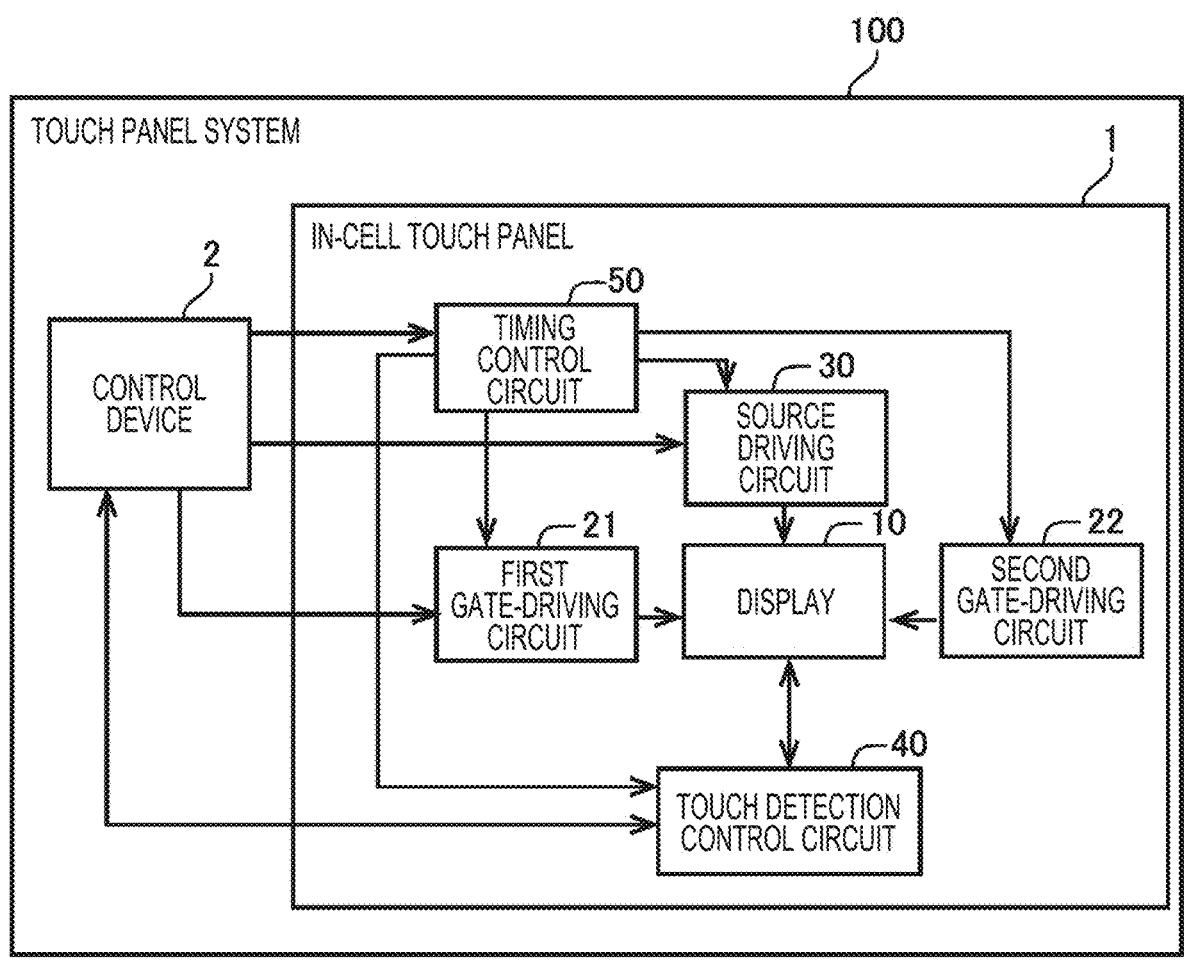
FIG. 1 is a block diagram illustrating a configuration of the touch panel system including an in-cell touch panel of a first embodiment.

Embodiments of the disclosure are described with reference to the drawings. The disclosure is not limited to the embodiments described below. The embodiments may be appropriately modified without departing from the scope of the disclosure. In the discussion that follows, like elements or elements having the same function are designated with the same reference numerals throughout different drawings and the discussion thereof are not repeated. Configurations in the embodiments and modifications of the embodiments may be combined or changed without departing from the scope of the disclosure. For easier understanding, the configurations may be simplified or clarified in the drawings, and some of components in each configuration may be omitted.

Overall Configuration of Display System

FIG. 1 is a block diagram illustrating the configuration of a touch panel system 100 including an in-cell touch panel 1 of an embodiment. Referring to FIG. 1, the touch panel system 100 includes an in-cell touch panel 1 (hereinafter simply referred to as touch panel 1) and a control device 2. For example, the touch panel system 100 is a personal computer, a tablet terminal, a smart phone, a smart watch or a television device with a touch detection function. The touch panel 1 is, for example, a liquid-crystal driving system but may be a driving system using a micro light emitting diode (LED) driving system or an organic electroluminescent (EL) driving system.

The control device 2 includes a processor performing a control process of the touch panel system 100. The control device 2 supplies the touch panel 1 with a video signal and a control signal and acquires touch detection results from the touch panel 1. The touch panel 1 has a touch detection function and a video display function.

Configuration of Touch Panel 1

Referring to FIG. 1, the touch panel 1 includes a display 10, a first gate-driving circuit 21, a second gate-driving circuit 22, a source driving circuit 30, a touch detection control circuit 40, and a timing control circuit 50.

Figure 2:
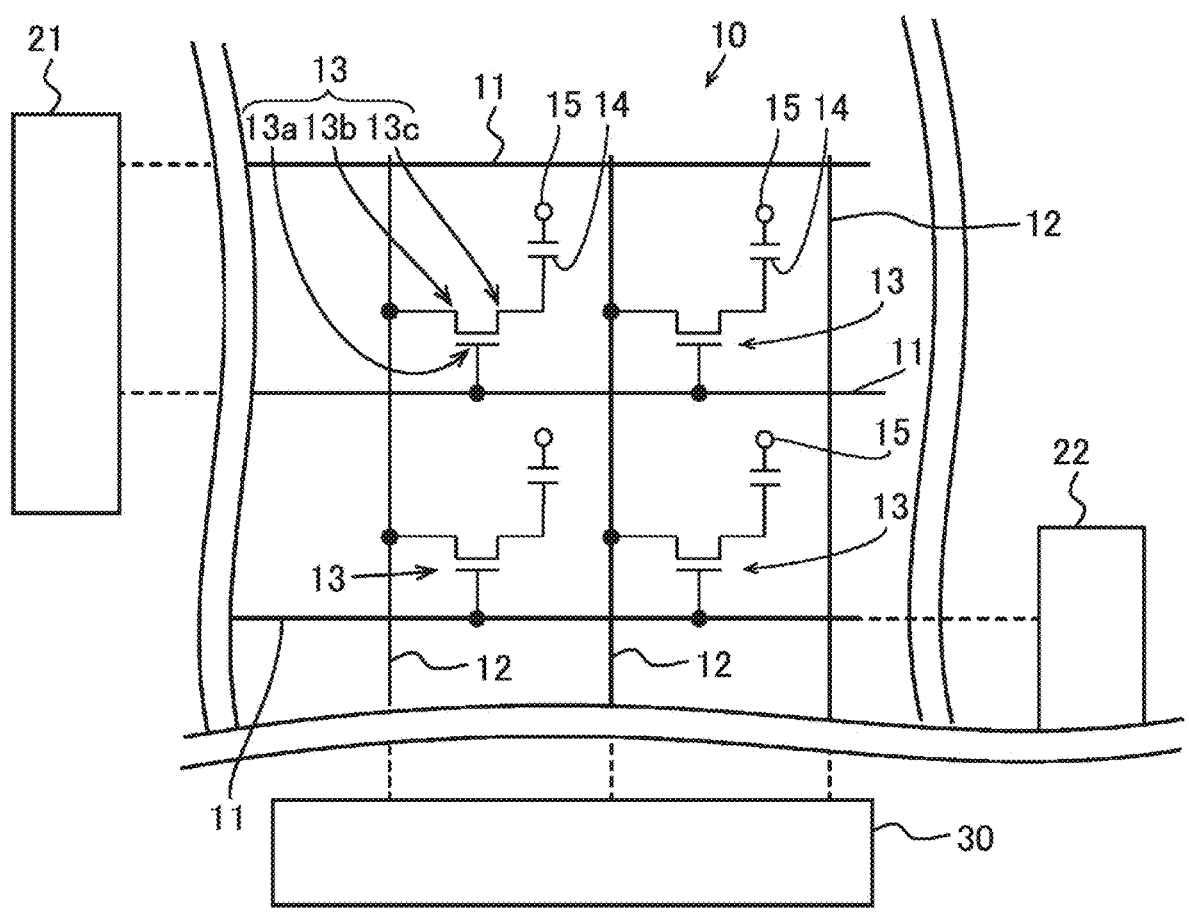
FIG. 2 is a circuit diagram schematically illustrating a configuration of a display.

FIG. 2 is a circuit diagram schematically illustrating the configuration of the display 10. Referring to FIG. 2, the display 10 includes multiple gate lines 11, multiple source lines 12, multiple transistors 13, multiple pixel electrodes 14, and multiple common electrodes 15. The gate lines 11 intersect the source lines 12 in plan view. Each of the regions (pixels) defined by the gate lines 11 and the source lines 12 includes the transistor 13 and the pixel electrode 14. The transistor 13 includes a gate electrode 13a, a source electrode 13b, and a drain electrode 13c. The gate electrode 13a is connected to the gate line 11. The source electrode 13b is connected to the source line 12. The drain electrode 13c is connected to the pixel electrode 14.

Figure 3:
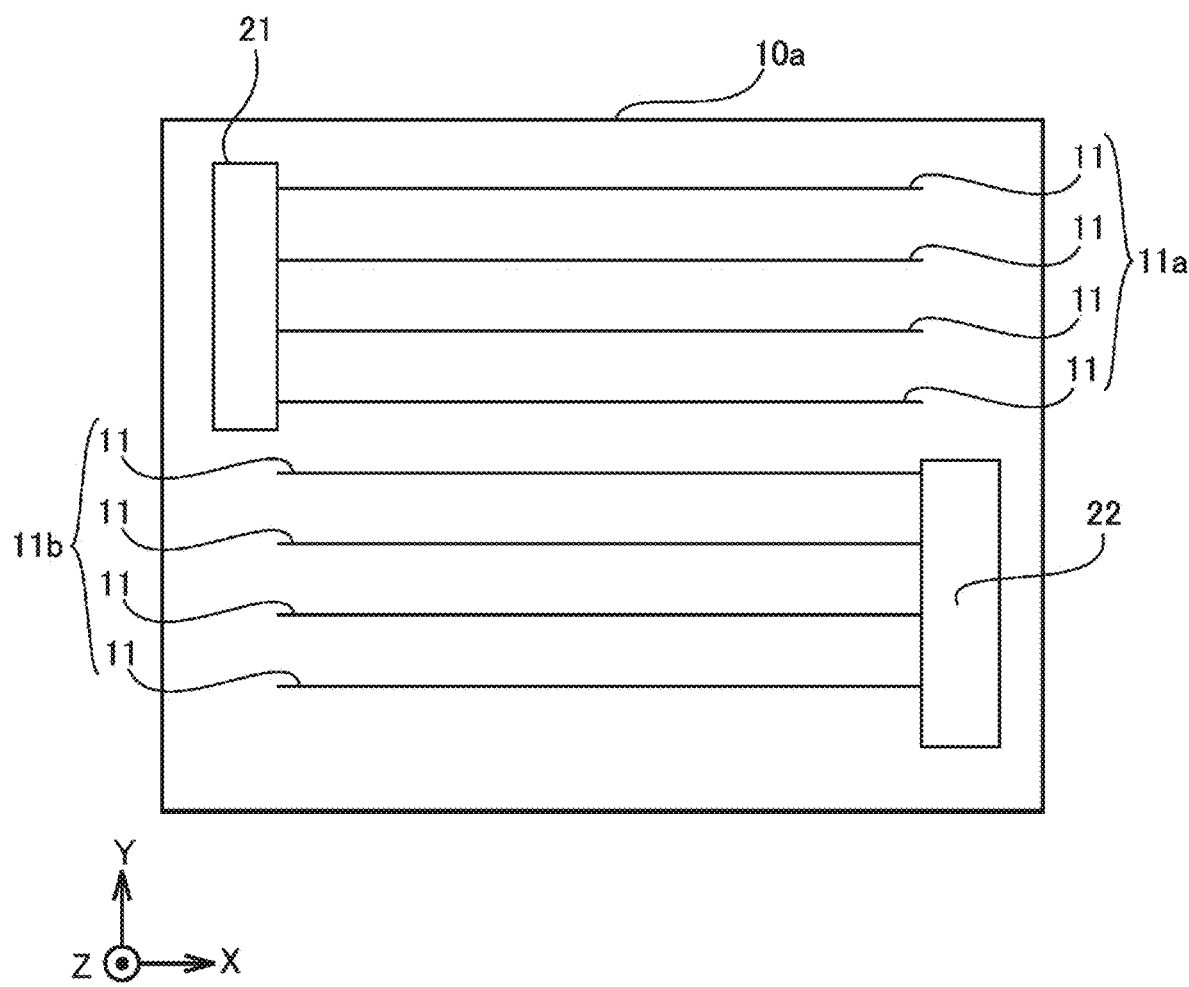
FIG. 3 schematically illustrates a configuration of a first gate-driving circuit and a second gate-driving circuit.

FIG. 3 schematically illustrates the configuration of the first gate-driving circuit 21 and the second gate-driving circuit 22. Referring to FIG. 3, the first gate-driving circuit 21 and the second gate-driving circuit 22 are monolithically formed on the substrate 10a of the touch panel 1 (gate driver monolithic (GDM) circuit). The first gate-driving circuit 21 outputs a gate signal to a first gate line group 11a among the gate lines 11. The second gate-driving circuit 22 outputs a gate signal to a second gate line group 11b among the gate lines 11. The first gate line group 11a is half of the gate lines 11 (for example, gate lines 11 in the upper half of a display screen).

The second gate line group 11b is the remaining half of the gate lines 11 (for example, the gate lines 11 in the lower half of the display screen). Supplying the first gate line group 11a and the second gate line group 11b with the gate signal signifies that the gate signal for one frame (for scanning) is supplied. Each of the first gate-driving circuit 21 and the second gate-driving circuit 22 includes a shift register. The first gate-driving circuit 21 outputs sequentially the gate signal to the gate lines 11 in the first gate line group 11a on a one-line-at-a-time basis. The second gate-driving circuit 22 outputs sequentially the gate signal to the gate lines 11 in the second gate line group 11b on a one-line-at-a-time basis. The "one frame" signifies one whole screen (image) displayed on the touch panel 1. The "one frame period" signifies a time period within which the writing of an image on all the pixel electrodes 14 arranged in the touch panel 1 is complete and signifies a period throughout which a gate start pulse (GSP) signal is supplied to the first gate-driving circuit 21 (namely, a period throughout which a vertical synchronization signal is supplied).

Figure 4:
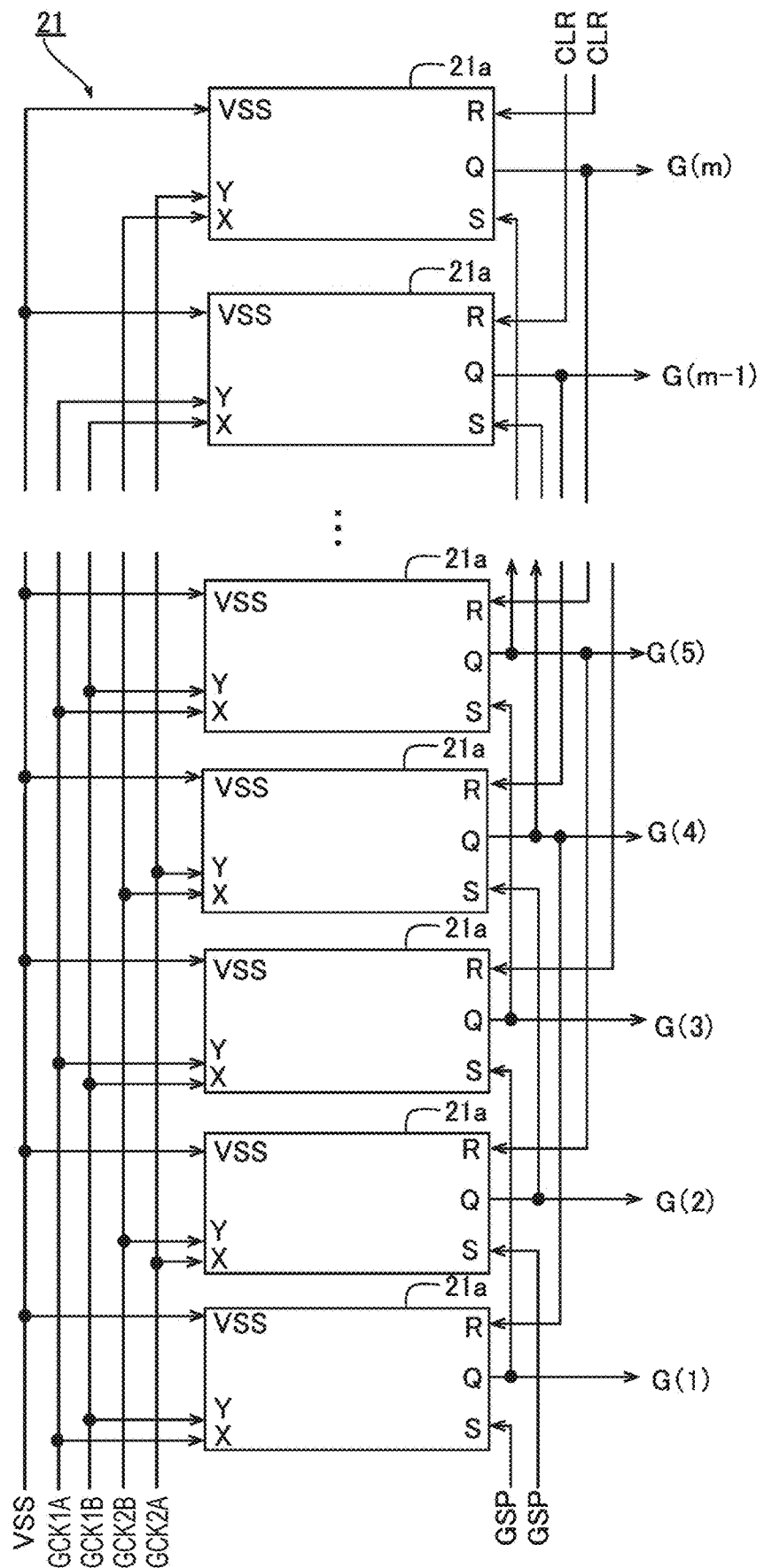
FIG. 4 illustrates the configuration of the first gate-driving circuit.
Figure 5:
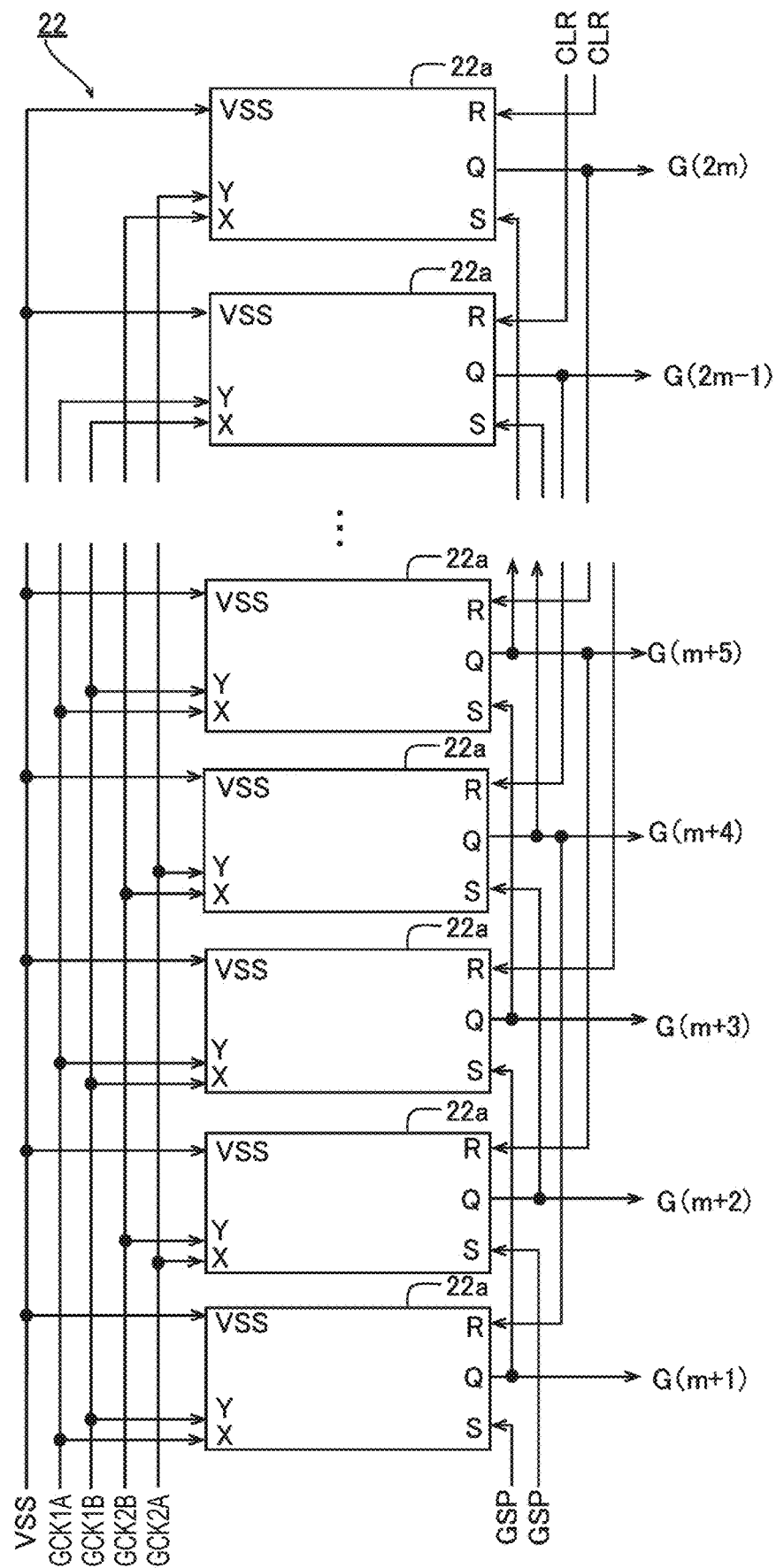
FIG. 5 illustrates the configuration of the second gate-driving circuit.
Figure 6:
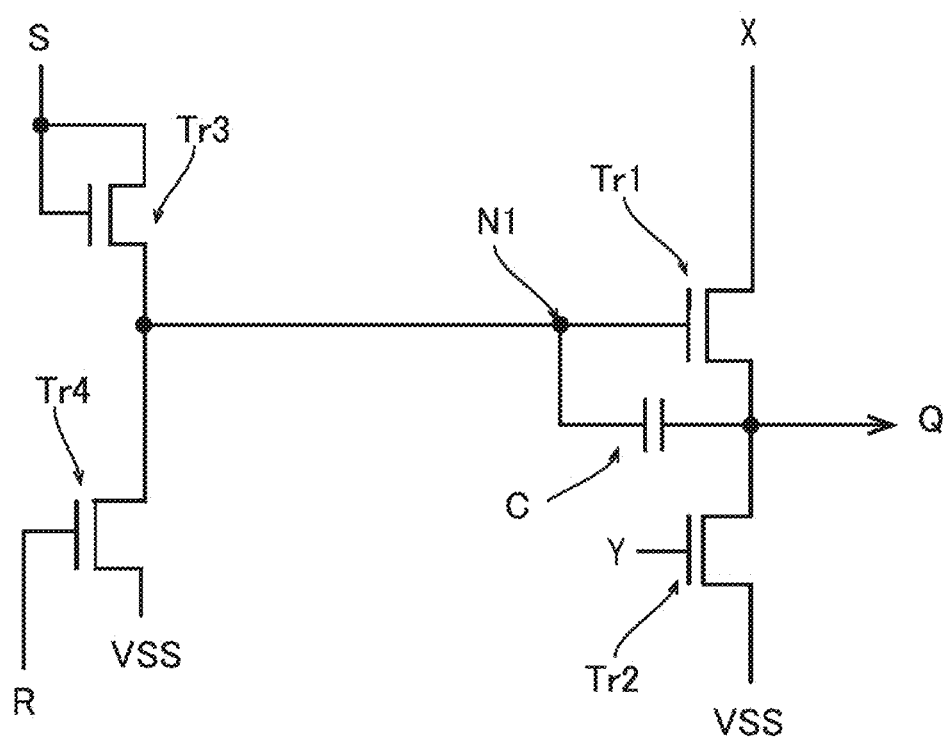
FIG. 6 is a circuit diagram illustrating a configuration of unit circuits.

FIG. 4 illustrates the configuration of the first gate-driving circuit 21. FIG. 5 illustrates the configuration of the second gate-driving circuit 22. FIG. 6 is a circuit diagram illustrating the configuration of a unit circuit 21a and a unit circuit 22a. As illustrated in FIG. 4, the first gate-driving circuit 21 includes the shift register including multiple unit circuits 21a. Referring to FIG. 5, the second gate-driving circuit 22 includes the shift register including multiple unit circuits 22a. The number of gate lines 11 included in the first gate line group 11a is m (natural number) and the number of gate lines 11 included in the second gate line group 11b is also m.

Specifically, the touch panel 1 includes 2m gate lines 11. The number of unit circuits 21a used is m. The first gate-driving circuit 21 is connected to each of the first gate line 11 through m-th gate line 11. The number of unit circuits 22a used is m. The second gate-driving circuit 22 is connected to each of the (m+1)-th gate line 11 through the 2m-th gate line 11.

Each of the first gate-driving circuit 21 and the second gate-driving circuit 22 receives from the timing control circuit 50 two-phase clock signals (GCK1A, GCK1B, GCK2A and GCK2B), gate start pulse GSP, clear signal CLR and reference potential VSS.

Referring to FIG. 6, the unit circuit 21a includes transistors Tr1 through Tr4, node N1, capacitor C, terminal X, terminal Y, terminal S, terminal R and terminal Q. The drain electrode of the transistor Tr1 is connected to the terminal X. The source electrode of the transistor Tr1 is connected to the terminal Q. The gate electrode of the transistor Tr1 is connected to the node N1. The drain electrode of the transistors Tr2 is connected to the terminal Q. The source electrode of the transistors Tr2 is connected to the reference potential VSS. The gate electrode of the transistors Tr2 is connected to the terminal Y. The drain electrode and the gate electrode of the transistors Tr3 are connected to the terminal S. The source electrode of the transistors Tr3 is connected to a node N1. The drain electrode of the transistors Tr4 is connected to the node N1. The source electrode of the transistors Tr4 is connected to the reference potential VSS. The gate electrode of the transistors Tr4 is connected to the terminal R. The capacitor C is connected between the node N1 and the terminal Q. The unit circuit 22a has the same configuration as the unit circuit 21a and the discussion thereof is thus omitted herein.

When the terminal S of the unit circuit 21a is supplied with a signal (set signal), the node N1 and the capacitor C are charged. When the terminal X of the unit circuit 21a is supplied with a signal (clock signal), the potential of the terminal Q rises, the node N1 is raised in potential by the charged capacitor C and a gate signal G is output from the terminal Q. Referring to FIG. 4, the gate signal output from the first gate line 11 is denoted by G(1) and the gate signal output from the m-th gate line 11 is denoted by G(m).

When the signal (clock signal) is input to the terminal Y of the unit circuit 21a as illustrated in FIG. 6, the potential of the terminal Q reaches the reference potential VSS, causing the gate signal to stop being output. When the signal (reset signal) is input to the terminal R of the unit circuit 21a, the potential of the node N1 becomes the reference potential VSS. Since the scanning operation of the first gate-driving circuit 21 is not interrupted in the embodiment, the node N1 of the m-th unit circuit 21a is free from holding voltage during a touch detection period T21.

Referring to FIG. 4, the terminal S of each of the first and second unit circuits 21a is supplied with the gate start pulse GSP. The gate signal G from a unit circuit 21a of interest is supplied to the gate line 11 and is also supplied to the terminal S of the unit circuit 21a that is two stages after the unit circuit 21a of interest (the gate signal G is input as a set signal). The gate signal G from the unit circuit 21a of interest is input to the terminal R of the unit circuit 21a that is three stages before the unit circuit 21a of interest (the gate signal G is input as a reset signal). A clear signal CLR is input to the terminals R of the m-th and (m−1)-th unit circuits 21a.

Referring to FIG. 5, the first through m-th unit circuits 22a are respectively connected to the (m+1)-th through 2m-th gate lines 11. The gate start pulse GSP is input to the terminal S of each of the first and second unit circuits 22a. The gate signal G from a unit circuit 22a of interest is input to the gate line 11 and is also input (as a set signal) to the terminal S of the unit circuit 22a that is two stages after the unit circuit 22a of interest. The gate signal G from the unit circuit 22a of interest is input (as a reset signal) to the terminal R of the unit circuit 22a that is three stages before the unit circuit 22a of interest. A clear signal CLR is input to the terminals R of the m-th and (m−1)-th unit circuits 22a.

The source driving circuit 30 illustrated in FIG. 2 is mounted on the substrate 10a of the touch panel 1. In response to the reception of a video signal and a source control signal from the control device 2, the source driving circuit 30 generates a source signal (data signal). The source driving circuit 30 then supplies the source signal to each of the source lines 12. When the transistor 13 is supplied with the gate signal (at a gate-on voltage), the source signal is written on the pixel electrode 14 via the transistor 13. An electric field is created between the pixel electrode 14 and the common electrodes 15, driving a liquid-crystal layer (not illustrated) and displaying an image on the touch panel 1.

Figure 7:
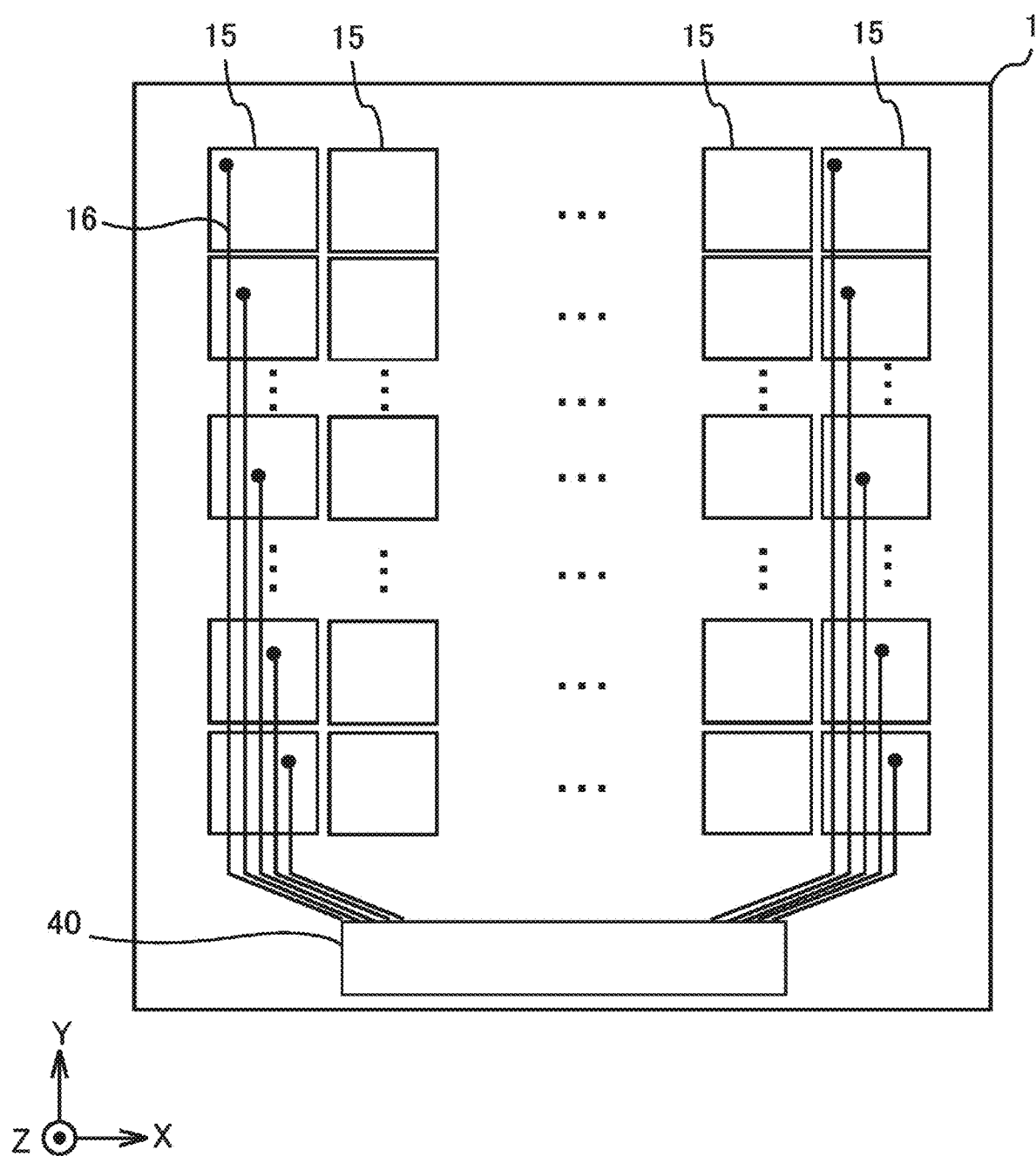
FIG. 7 illustrates a configuration of common electrodes.

FIG. 7 illustrates the configuration of the common electrodes 15. Referring to FIG. 7, the common electrodes 15 are arranged in columns. The touch detection control circuit 40 is connected to each of the common electrodes 15 via a wiring 16. The common electrode 15 is capacitively coupled with a pointer, thus varying capacitance. For the time durations through which a touch detection operation is performed (touch detection time periods T21 and T22 (see FIG. 8)), the touch detection control circuit 40 supplies a touch driving signal (pulse signal) to the common electrodes 15. The waveform of the pulse signal varies depending on the magnitude of the capacitance of the common electrodes 15. The touch detection control circuit 40 detects a touch (touch position) of the pointer in accordance with the waveform of the pulse signal from the common electrode 15. In other words, the common electrode 15 also serves as a touch detection electrode. The touch panel 1 is a self-capacitance panel. The touch panel 1 is not limited to the self-capacitance panel. The touch panel 1 may be a mutual-capacitance panel.

Control Process of Touch Panel 1

Figure 8:
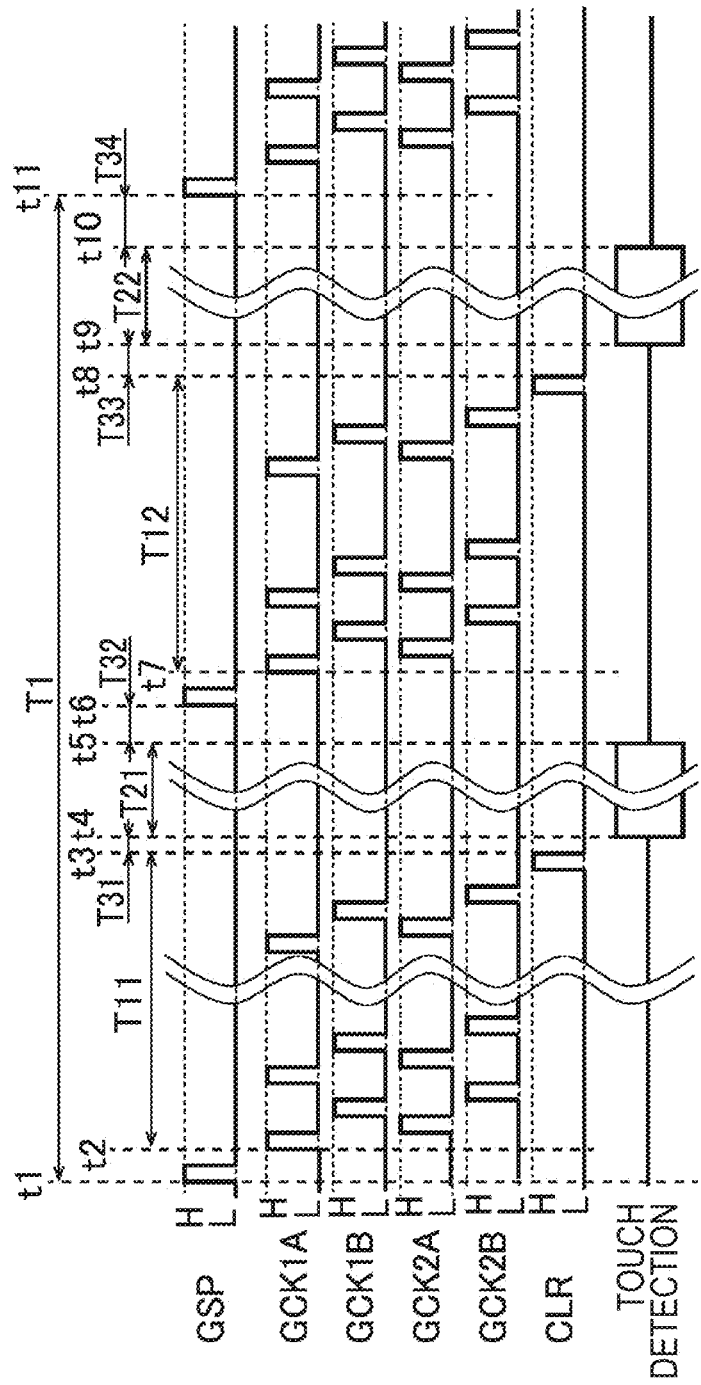
FIG. 8 is a timing diagram illustrating an operation of the touch panel.

FIG. 8 is a timing diagram explaining the operation of the touch panel 1. The timing control circuit 50 illustrated in FIG. 1 receives control signals (a vertical synchronization signal and a horizontal synchronization signal) from the control device 2 and determines, in response to the control signals as illustrated in FIG. 8, a timing to perform a first scanning operation driving the first gate-driving circuit 21, a timing to perform a second scanning operation driving the second gate-driving circuit 22, and a timing to perform a touch detection operation causing the touch detection control circuit 40 to detect a touch. The "first scanning operation" supplies the gate signal to the gate lines 11 included in the first gate line group 11a on a one-line-at-a-time basis. Referring to FIG. 4, the first scanning operation supplies sequentially the gate signal to the first through m-th gate lines 11. The "second scanning operation" supplies the gate signal to the gate lines 11 included in the second gate line group 11b on a one-line-at-a-time basis. Referring to FIG. 5, the second scanning operation supplies sequentially the gate signal to the (m+1)-th through 2m-th gate lines 11. The "touch detection operation" acquires touch detection results from all the common electrodes 15 in the touch panel 1.

First Scanning Operation

At time t1, the timing control circuit 50 supplies the gate start pulse GSP to the first gate-driving circuit 21 to start the first scanning operation on the first gate-driving circuit 21.

One frame period T1 lasts from t1 at which the first gate-driving circuit 21 is supplied with the gate start pulse GSP to t11 at which the first gate-driving circuit 21 is supplied next with the gate start pulse GSP. During one frame period T1, an image is written on all the pixel electrodes 14 arranged in the display 10 (the writing of one frame is performed). According to the embodiment, for example, one frame period T1 is 16.67 ms and the refresh rate of image is 60 Hz. The refresh rate of touch detection may be 120 Hz or higher to appropriately detect the movement of the touch position of the pointer. In the embodiment, the refresh rate of the touch detection is set 120 Hz. Specifically, the touch detection operation is performed twice during one frame period T1.

The timing control circuit 50 supplies a clock signal GCK1A to the first gate-driving circuit 21 at time t2. The timing control circuit 50 then supplies sequentially clock signals GCK2A, GCK1B and GCK2B to the first gate-driving circuit 21. In response to the reception of the clock signals GCK1A, GCK2A, GCK1B, and GCK2B, the first gate-driving circuit 21 supplies the gate signal to the first gate line group 11a. When all the gate lines 11 of the first gate line group 11a are supplied with the gate signal by the first gate-driving circuit 21, the timing control circuit 50 resets the shift register in the first gate-driving circuit 21 at time t3 by supplying the clear signal CLR to the first gate-driving circuit 21. This completes image writing on half the pixel electrodes 14 in the display 10 within a first scanning period T11 lasting from time t2 to time t3. After the touch detection operation performed subsequent to the image writing (namely, after a touch detection period T21), the second gate-driving circuit 22 is driven and the first gate-driving circuit 21 is thus free from holding voltage.

Touch Detection Operation at First Time

At time t4 after time t3, the timing control circuit 50 transmits to the touch detection control circuit 40 a signal that instructs the touch detection control circuit 40 to detect a touch. The touch detection control circuit 40 supplies a driving signal to all the common electrodes 15 arranged in the display 10 during a touch detection period T21 lasting from time t4 to time t5 and then detects detection signals from all the common electrodes 15. In other words, the touch detection control circuit 40, when performing one touch detection operation, acquires the detection signals from all the common electrodes 15 arranged in the touch panel 1.

Second Scanning Operation

At time t6 after time t5, the timing control circuit 50 supplies the gate start pulse GSP to the second gate-driving circuit 22 to start a second scanning operation on the second gate-driving circuit 22. At time t7 thereafter, the timing control circuit 50 supplies the clock signal GCK1A to the second gate-driving circuit 22. The timing control circuit 50 then supplies sequentially clock signals GCK2A, GCK1B and GCK2B to the second gate-driving circuit 22. In response to the reception of the clock signals GCK1A, GCK2A, GCK1B, and GCK2B, the second gate-driving circuit 22 supplies the gate signal to the second gate line group 11b. When all the gate lines 11 in the second gate line group 11b are supplied with the gate signal by the second gate-driving circuit 22, the timing control circuit 50 resets the shift register in the second gate-driving circuit 22 at time t8 by supplying the clear signal CLR to the second gate-driving circuit 22. This completes image writing on the remaining half of the pixel electrodes 14 in the display 10 within a second scanning period T12 lasting from time t7 to time t8. The image writing on all the pixel electrodes 14 arranged in the display 10 is thus complete.

Touch Detection Operation at Second Time

At time t9 after time t8, the timing control circuit 50 transmits to the touch detection control circuit 40 a signal that instructs the touch detection control circuit 40 to detect a touch. The touch detection control circuit 40 supplies a driving signal to all the common electrodes 15 arranged in the display 10 during a touch detection period T22 lasting from time t9 to time t10 and then detects detection signals from all the common electrodes 15. In the embodiment, the touch detection operation is performed twice during one frame period T1 (when the image writing is performed on all the pixel electrodes 14).

Results of Comparison with Comparative Example

Figure 9:
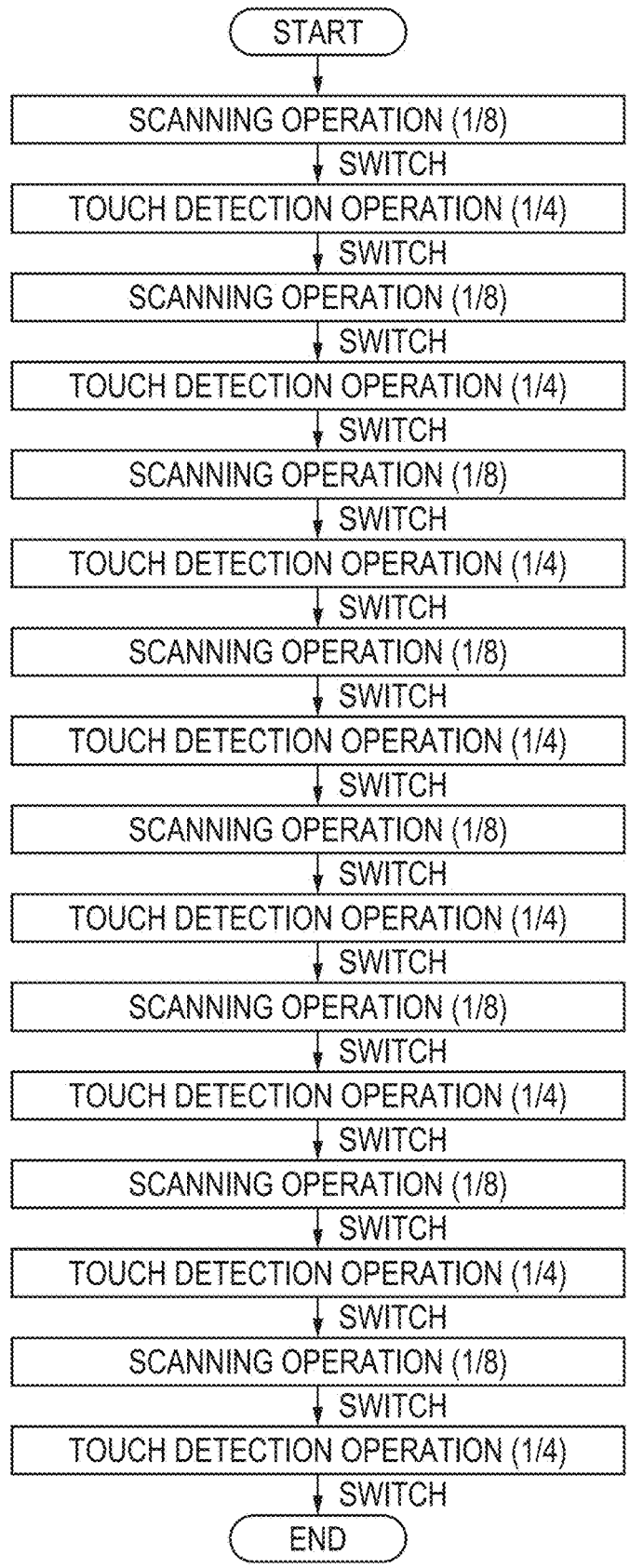
FIG. 9 is a flowchart illustrating a control process of a touch panel as a comparative example performed during one frame period.
Figure 10:
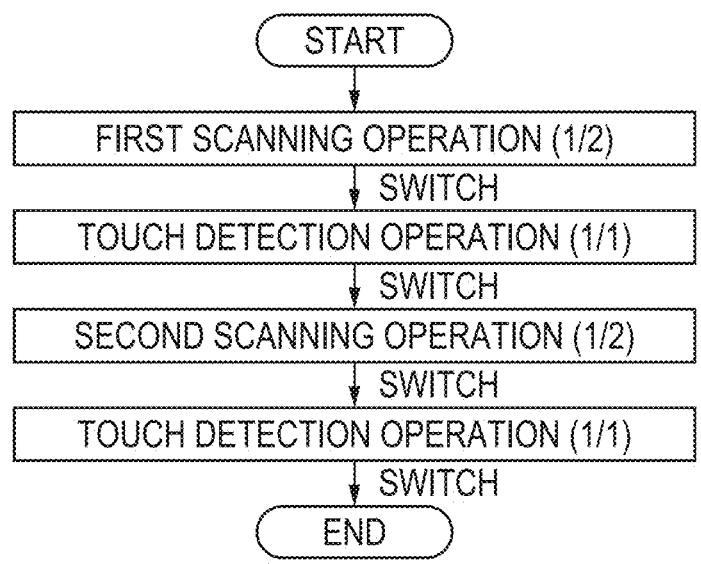
FIG. 10 is a flowchart illustrating a control process of the touch panel of the embodiment performed during one frame.

Results of comparison of the touch panel 1 of the embodiment with a touch panel as a comparative example are described with reference to FIGS. 9 and 10. FIG. 9 is a flowchart illustrating a control process of a touch panel as a comparative example performed during one frame period. FIG. 10 is a flowchart illustrating a control process of the touch panel 1 of the embodiment performed during one frame period.

While the touch detection operation is performed, voltages used to resume a scanning operation are held in the gate-driving circuit (in the state that the gate-driving circuit is not reset) in the touch panel of the comparative example. The refresh rate of the touch detection is set to 120 Hz in the touch panel of the comparative example. A time duration used to perform the touch detection operation to acquire the detection signal from all the common electrodes is about 1.5 ms. However, a time duration throughout which the voltages may be held in the gate-driving circuit is about 0.5 ms that is shorter than 1.5 ms. The length of the time duration used to perform the touch detection operation may thus be 0.5 ms or shorter. Four or more touch detection operations are performed as illustrated in FIG. 9 to acquire the detection signal from all the common electrodes (the detection signal during one frame). In the comparative example, switching between the scanning operation and the touch detection operation is performed 16 times to acquire the detection signal for two frames.

Since the touch panel 1 of the embodiment causes to perform the second scanning operation the second gate-driving circuit 22 different from the first gate-driving circuit 21 having performed the first scanning operation, the first gate-driving circuit 21 is free from holding voltages (for example, at the node N1 in FIG. 6) during the touch detection period T21. As a result, since no limitation is imposed on the length (of the touch detection period T21 illustrated in FIG. 8) between the first scanning operation and the second scanning operation as illustrated in FIG. 10, the touch detection operation may be performed during the time duration (the touch detection period T21) between the first scanning operation and the second scanning operation to acquire the detection signal from all the common electrodes 15. As a result, the number of switching of the touch detection operation, the first scanning operation, and the second scanning operation during one frame period T1 may be reduced while the refresh rate of the touch detection is maintained. In contrast with 16 times as the number of switching operations in the comparative example, the number of switching operations may be reduced to four times in the example of the embodiment illustrated in FIG. 10. Referring to FIG. 8, time used to perform the switching operation is time duration T31 between time t3 and time t4, time duration T32 between time t5 and time t6, time duration between T33 time t8 and time t9, and time duration T34 between time t10 and time t11. The length of the time used to perform a single switching operation is substantially constant and not related to the length of the time of the touch detection operation. The sum of time durations for switching during one frame period in the embodiment (four times the time duration used to perform one switching operation) is smaller than the sum of time durations for switching during one frame period of the touch panel in the comparative example (16 times the time duration used to perform one switching operation). In this way, the length of the time duration (for switching) excluding the time duration for the first scanning operation, the second scanning operation, and the touch detection operation may be shortened. The touch panel 1 may thus be operated at a higher refresh rate.

Modifications

The embodiment has been described for exemplary purposes only. The disclosure is not limited to the embodiment and may be modified or changed without departing from the scope of the disclosure. Modifications of the embodiment are described below.

(1) In the embodiment, the touch detection operation is performed twice during one frame period. The disclosure is not limited to this method. For example, the touch detection operation may be performed three times or more.

(2) In the embodiment, the refresh rate of image is set to 60 Hz and the refresh rate of the touch detection is set to 120 Hz. The disclosure is not limited to this method. For example, the refresh rate of image may be set to a frequency other than 60 Hz and the refresh rate of the touch detection may be set to a frequency other than 120 Hz.

(3) In the embodiment, the touch detection control circuit acquires the detection signal from all the common electrodes arranged in the touch panel when the touch detection operation is performed once. The disclosure is not limited to this method. For example, when the touch detection operation is performed once, the touch detection control circuit may acquire the detection signal from a subset of the common electrodes.

(4) In the embodiment, the first gate line group and the second gate line group form all the gate lines arranged in the touch panel. The disclosure is not limited to this method. For example, the gate lines arranged in the touch panel may include other gate line group (for example, a third gate line group and a fourth gate line group) in addition to the first gate line group and the second gate line group.

(5) In the embodiment, the first gate-driving circuit and the second gate-driving circuit are arranged in a frame region of the touch panel as illustrated in FIG. 1. The disclosure is not limited to this method. For example, circuit elements forming each of the first gate-driving circuit and the second gate-driving circuit may be distributed within a pixel region of the display (as in an in-pixel gate driver monolithic (IPGDM) circuit).

The in-cell touch panel and the control method thereof may be also described as below.

According to a first configuration of the disclosure, there is provided an in-cell touch panel including: a first scanning line driving circuit that supplies a display driving signal to a first scanning line group among multiple scanning lines; a second scanning line driving circuit that supplies a display driving signal to a second scanning line group among the scanning lines; a touch detection circuit that detects a touch by a pointer by acquiring a detection signal from at least a subset among multiple touch detection electrodes; and a control circuit, wherein the control circuit performs a first scanning operation that causes the first scanning line driving circuit to supply the display driving signal to the first scanning line group, performs a touch detection operation that detects the touch with the touch detection circuit after the first scanning operation, performs a second scanning operation that causes the second scanning line driving circuit to supply the display driving signal to the second scanning line group after the touch detection operation, and performs the touch detection operation after the second scanning operation (first configuration).

If the touch detection operation is performed during one frame period with all the scanning lines supplied with the display driving signal from a single scanning line driving circuit, an scanning operation is interrupted. In such a case, the voltages are held in the scanning line driving circuit until the scanning operation resumes. Since the time throughout which the voltages are held in the scanning line driving circuit is subject to an upper limit, the touch detection operation is also interrupted. The switching between the scanning operation and the touch detection operation may be performed a number of times within one frame period. As a result, since a time duration (time used to perform one switching operation multiplied by the number of switching operations) excluding a time duration used to perform the scanning operation and the touch detection operation is prolonged within one frame period, operating the touch panel at a higher refresh rate is difficult. According to the first configuration, since the second scanning operation is performed by the second scanning line driving circuit different from the first scanning line driving circuit having performed the first scanning operation, the first scanning line driving circuit is free from holding the voltages. Since the time between the first scanning operation and the second scanning operation is thus free from a length limit, the touch detection operation is performed without being interrupted between the first scanning operation and the second scanning operation. As a result, the number of touch detection operations may be reduced. This leads to reducing the number of switching operations between the touch detection operation and the scanning operation (the first scanning operation or the second scanning operation) within one frame period. Since the time duration (time used to perform one switching operation multiplied by the number of switching operations) excluding the time duration used to the scanning operation and the touch detection operation may be shortened within one frame period, operating the touch panel at a higher refresh rate may be performed.

According to the first configuration, the control circuit may cause, when the touch detection operation is performed once, the touch detection circuit to acquire the detection signal from all the touch detection electrodes (second configuration).

According to the second configuration, a single touch detection operation may detect a touch on all the touch detection electrodes. The number of touch detection operations may thus be reduced.

According to one of the first and second configurations, the control circuit may supply the display driving signal to all the scanning lines by performing the first scanning operation and the second scanning operation (third configuration).

According to the third configuration, scanning the entire one frame may be performed by performing the first scanning operation and the second scanning operation. The number of first scanning operation and the number of second scanning operations may be reduced.

According to a fourth configuration of the disclosure, there is provided a control method of an in-cell touch panel including: a first scanning line driving circuit that supplies a display driving signal to a first scanning line group among multiple scanning lines; a second scanning line driving circuit that supplies a display driving signal to a second scanning line group among the scanning lines; a touch detection circuit that detects a touch by a pointer by acquiring a detection signal from at least a subset among multiple touch detection electrodes; and a control circuit, the control method including: performing a first scanning operation that causes the first scanning line driving circuit to supply the display driving signal to the first scanning line group, performing a touch detection operation that detects the touch with the touch detection circuit after the first scanning operation, performing a second scanning operation that causes the second scanning line driving circuit to supply the display driving signal to the second scanning line group after the touch detection operation, and performing the touch detection operation after the second scanning operation (fourth configuration).

According to the fourth configuration, the control method of the in-cell touch panel enabled to be operative at a higher refresh rate may be provided.

The present disclosure contains subject matter related to that disclosed in Japanese Priority Patent Application JP 2023-196043 filed in the Japan Patent Office on Nov. 17, 2023, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An in-cell touch panel comprising:
a first scanning line driving circuit that supplies a first display driving signal to a first scanning line group among a plurality of scanning lines;
a second scanning line driving circuit that supplies a second display driving signal to a second scanning line group among the plurality of scanning lines;
a touch detection circuit that detects a touch received from a pointer by acquiring a detection signal from at least a subset of touch detection electrodes among a plurality of touch detection electrodes; and
a control circuit,
wherein the control circuit:
    performs a first scanning operation that causes the first scanning line driving circuit to supply the first display driving signal to the first scanning line group,
    performs a reset operation by resetting the first scanning line driving circuit, such that a voltage is not held in the first scanning line driving circuit after the first scanning operation,
    performs a touch detection operation that detects the touch with the touch detection circuit after the reset operation,
    performs a second scanning operation that causes the second scanning line driving circuit to supply the second display driving signal to the second scanning line group after the touch detection operation, and
    performs the touch detection operation after the second scanning operation.
2. The in-cell touch panel according to claim 1, wherein the control circuit causes, when the touch detection opera- tion is performed once, the touch detection circuit to acquire the detection signal from all of the plurality of touch detection electrodes.

3. The in-cell touch panel according to claim 1, wherein the control circuit supplies the first display driving signal and the second display driving signal to all the plurality of scanning lines by performing the first scanning operation and the second scanning operation.

4. A control method performed by an in-cell touch panel that includes: a first scanning line driving circuit that supplies a first display driving signal to a first scanning line group among a plurality of scanning lines, a second scanning line driving circuit that supplies a second display driving signal to a second scanning line group among the plurality of scanning lines, a touch detection circuit that detects a touch received from a pointer by acquiring a detection signal from at least a subset of touch detection electrodes among a plurality of touch detection electrodes, and a control circuit, the control method comprising:

performing a first scanning operation that causes the first scanning line driving circuit to supply the first display driving signal to the first scanning line group;

performing a reset operation by resetting the first scanning line driving circuit, such that a voltage is not held in the first scanning line driving circuit after the first scanning operation;

performing a touch detection operation that detects the touch with the touch detection circuit after the reset operation;

performing a second scanning operation that causes the second scanning line driving circuit to supply the second display driving signal to the second scanning line group after the touch detection operation; and performing the touch detection operation after the second scanning operation.

* * * * *